Jan. 13, 1925.

W. H. WANGELIN 1,523,148

MOLD FILLING MACHINE

Filed April 24, 1922

INVENTOR
Walter H. Wangelin
By
Bakewell & Church
ATTORNEYS

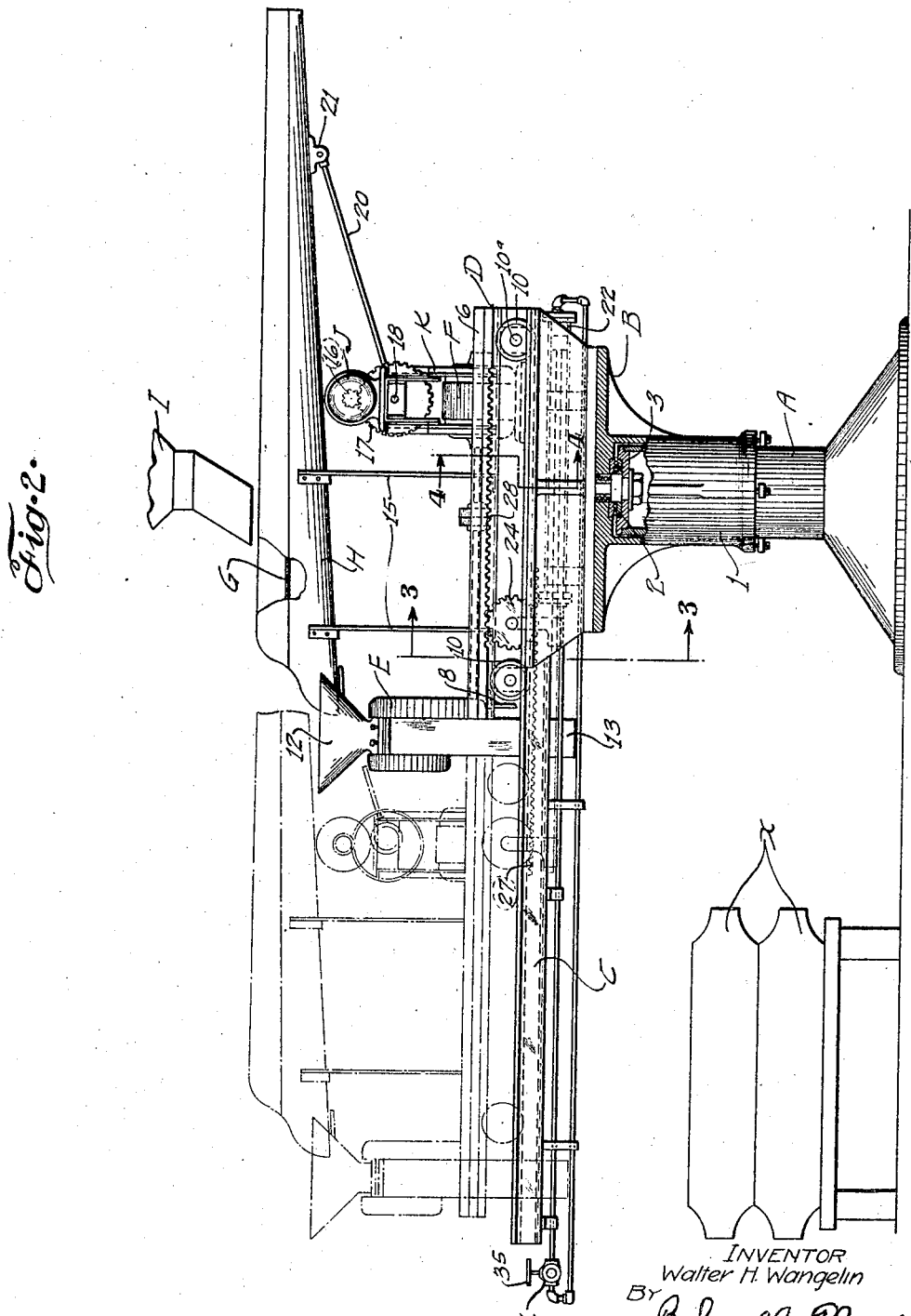

Jan. 13, 1925.
W. H. WANGELIN
MOLD FILLING MACHINE
Filed April 24, 1922
1,523,148
4 Sheets-Sheet 3
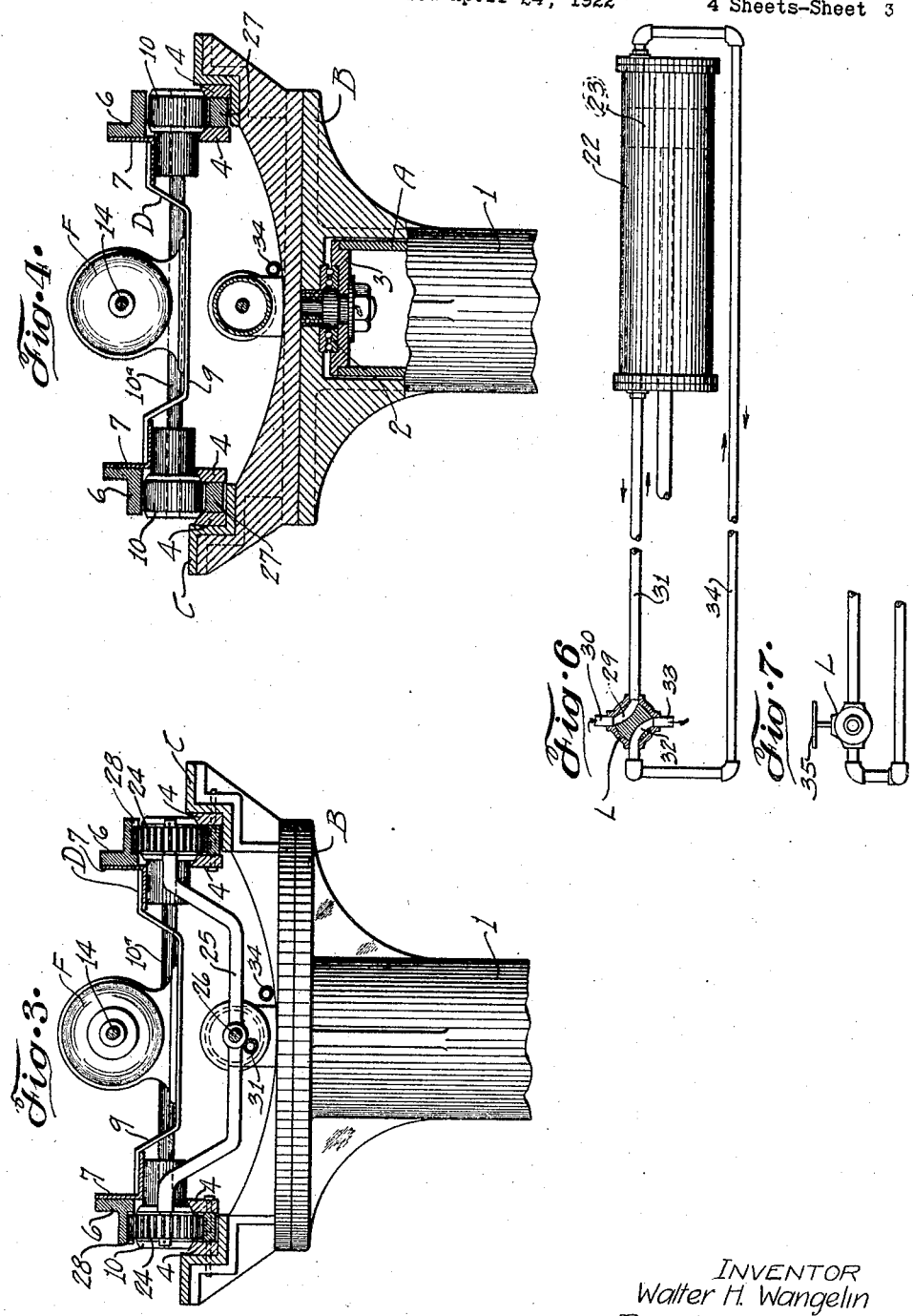
INVENTOR
Walter H. Wangelin
BY
ATTORNEYS

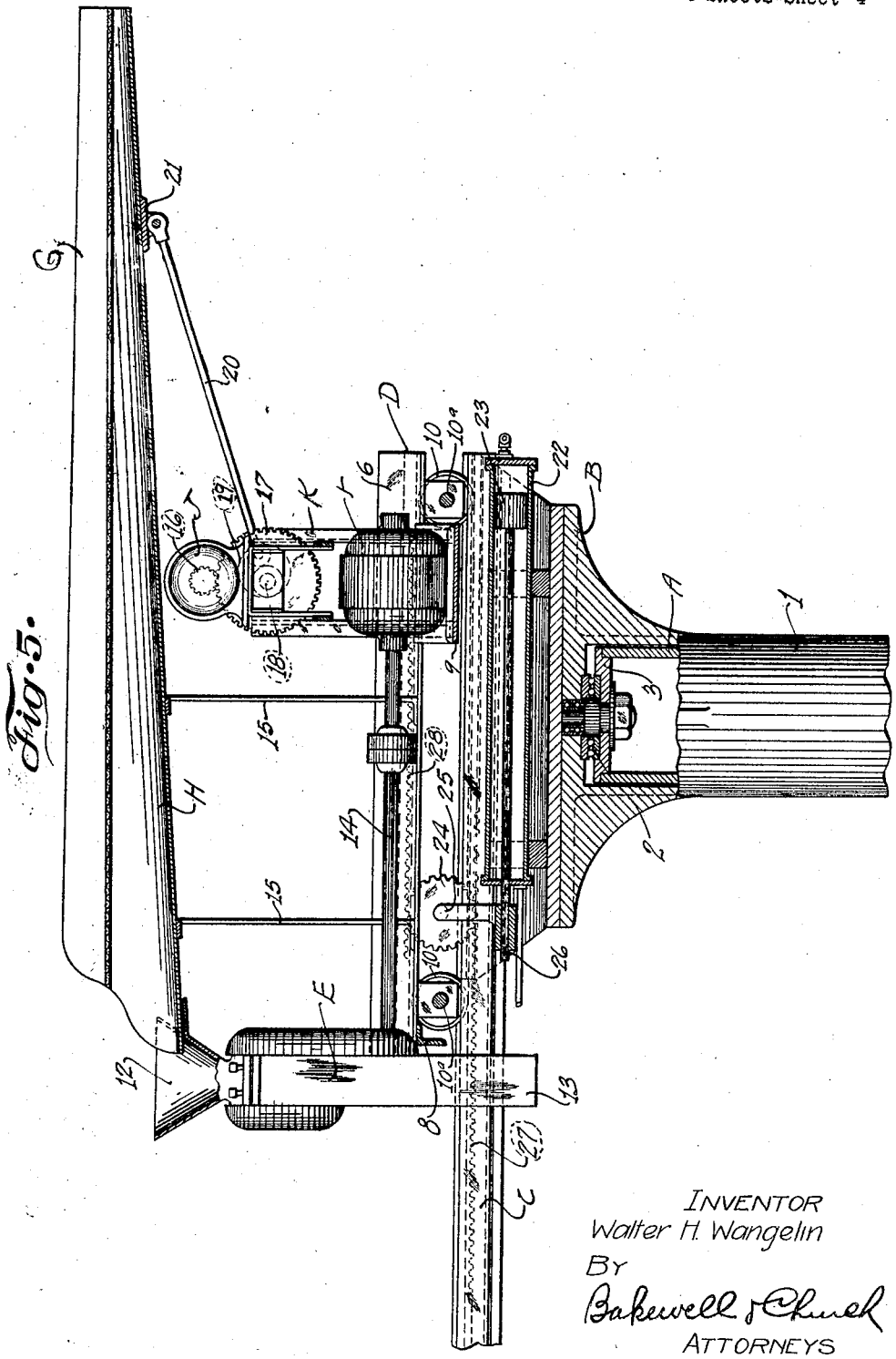

Patented Jan. 13, 1925.

1,523,148

UNITED STATES PATENT OFFICE.

WALTER H. WANGELIN, OF ST. LOUIS, MISSOURI.

MOLD-FILLING MACHINE.

Application filed April 24, 1922. Serial No. 556,165.

*To all whom it may concern:*

Be it known that I, WALTER H. WANGE-LIN, a citizen of the United States, residing at St. Louis, Missouri, have invented a certain new and useful Improvement in Mold-Filling Machines, of which the following is a full, clear, and exact description, such as will enable others skilled in the art to which it appertains to make and use the same.

This invention relates to machines of the kind that are used for filling a flask or other mold with molding material, and has for its main object to provide a machine of the type referred to, which is so constructed that the projecting and impacting apparatus which supplies the molding material to the mold can be moved back and forth and laterally over the mold easily and rapidly enough to insure the molding material being spread evenly and uniformly over the entire area of the mold.

To this end I have devised a mold filling machine that is equipped with a power operated means for effecting the movement of the projecting and impacting apparatus relatively to the mold so as to spread the molding material over the mold. It is immaterial, so far as my broad idea is concerned, what particular kind of projecting and impacting apparatus is used, for introducing the molding material into the mold, what particular means is employed for supporting said apparatus and what particular type or kind of power operated means is used for moving said projecting and impacting apparatus relatively to the mold, but I prefer to mount the said projecting and impacting apparatus on a carriage that can travel back and forth on a swinging crane and use a fluid operated means for reciprocating said carriage so as to spread the molding material that is being discharged into the mold by the projecting and impacting apparatus. In view of the fact that machines of the type to which my invention relates are principally used for filling a sand flask with sand, I have herein illustrated the machine as being used for filling a sand flask and have referred to the projecting and impacting apparatus of the machine as a sand projecting apparatus, but I wish it to be understood that the invention is applicable to any kind of machine that is used for filling a mold with molding material.

Figure 1 of the drawings is a top plan view of a flask filling machine constructed in accordance with my invention.

Figure 2 is a side elevational view of said machine, partly broken away, to illustrate the construction of the revolving table.

Figures 3 and 4 are transverse sectional views, taken on the lines 3—3 and 4—4, respectively, of Figure 2, looking in the direction indicated by the arrows.

Figure 5 is a vertical longitudinal sectional view, taken on the line 5—5 of Figure 1, looking in the direction indicated by the arrows.

Figure 6 is a detail view of the fluid operated means that is used for reciprocating the carriage; and Figure 7 is a detail view of the two-way valve that governs the admission and exhaust of the operating medium to and from the cylinder of said fluid operated means.

Figure 1:
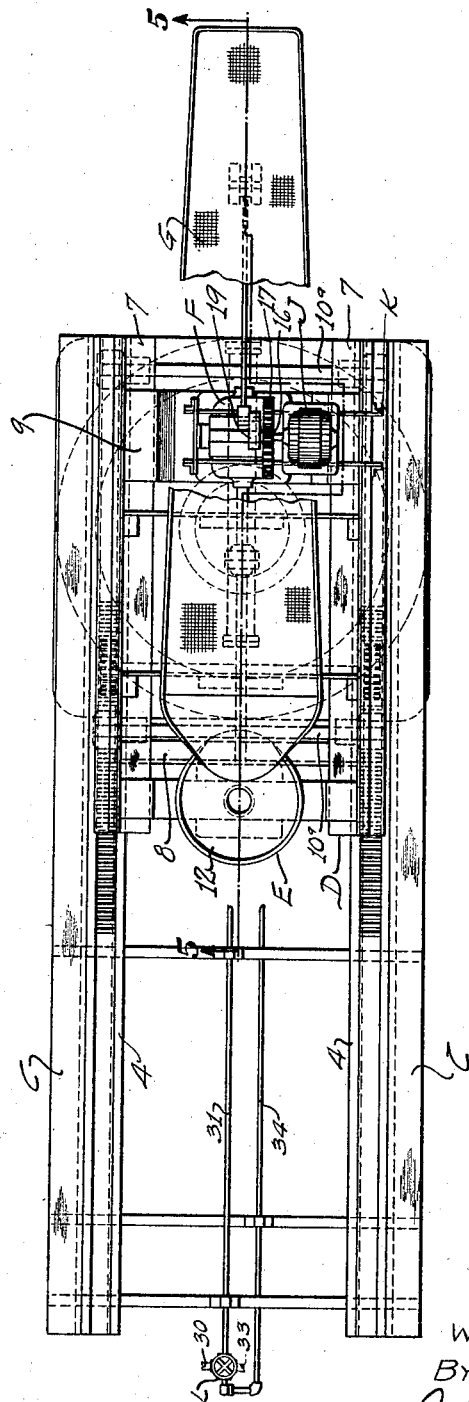

Referring to the drawings which illustrate the preferred form of my invention, A designates a vertically-disposed upright or supporting structure on which a horizontally-disposed table B is rotatably mounted, and C designates horizontally-disposed members that project laterally from said table so as to form a crane that carries a track on which a carriage D is reciprocatingly mounted. The carriage D is provided with a sand projecting apparatus E of any preferred type or kind for discharging sand or other molding material into a flask indicated by the reference character $x$ in Figure 2, and means under control of the operator in charge of the machine is provided for moving said carriage into a position to cause the discharge spout of the sand projecting apparatus to be positioned over the flask and for reciprocating said carriage so as to cause said discharge spout to move back and forth over the flask. By swinging the crane laterally with relation to the flask and reciprocating the carriage, the sand can be distributed uniformly and evenly over the entire area of the flask.

The table B is provided with a depending cylindrical sleeve 1 that surrounds the upright A and a friction-reducing bearing 2 of any suitable kind is interposed between said table and a cap piece 3 at the upper end of the upright A, so as to insure said table turning freely on said upright. The horizontally-disposed members C that project laterally from the table B preferably consist of flanged bars, each of which is equipped with a grooved rail composed of two parallel bars 4 spaced apart and having their top edges beveled in opposite directions, as shown in Figures 3 and 4. The reciprocating carriage D, which may be of any preferred construction or design, is herein illustrated as composed of two horizontally-disposed side pieces 6, preferably heavy angle bars, arranged with their horizontal flanges projecting outwardly, and two light-weight, angle-shaped members 7 connected to the side pieces 6 and arranged with their horizontal flanges projecting inwardly, said side members 6 being connected together at one end of the carriage by a transversely-disposed cross piece 8 and connected together at the other end of the carriage by a relatively wide, transversely-disposed cross piece 9 that forms a support for an electric motor F that will be hereinafter described. Adjacent the front and rear ends of the carriage D are rollers 10 that travel on the track formed by the rail bars 4, said rollers being carried by transversely-disposed shafts 10ª that are journaled in suitable bearings which project downwardly from the members 7 of the carriage.

In order that sand will be supplied to the sand projecting apparatus E continuously when the machine is in operation, I have provided the carriage D with an agitated screen G and a delivery chute H that receives sand from a stationary hopper I or other source of supply and delivers said sand to the funnel or sand receiving portion 12 of the sand projecting apparatus E on the carriage. As it is immaterial, so far as my present invention is concerned, what type or kind of sand projecting and impacting apparatus the carriage D is equipped with, I have not illustrated the construction of the sand projecting apparatus E of the machine herein illustrated. Suffice it to say that said sand projecting apparatus E comprises a rotatable member (not shown) for projecting sand downwardly through a discharge spout 13 that is adapted to be positioned over the flask to be filled, a horizontally-disposed shaft 14 for actuating the rotor of said projecting apparatus and an electric motor F mounted on the carriage D and directly connected to the shaft 14, thereby producing a structure in which the rotor of the projecting apparatus and the electric motor that actuates same are directly connected together, and both of said elements are carried by the carriage D. The delivery chute H consists of a substantially horizontally-disposed trough whose discharge end terminates in alignment with the receiving funnel 12 of the sand charging apparatus E, and the screen G is formed by a piece of wire mesh or other suitable screening material that is arranged horizontally between the side walls of the delivery chute H, as shown in Figures 2 and 5, said chute and screen being long enough so that they will always remain in operative relationship with the stationary hopper I in any position of the carriage. The chute H is supported by flexible uprights 15 whose lower ends are connected to the carriage D, and means is provided for agitating said chute so as to sift the sand through the screen G and cause the sand that passes through said screen to flow longitudinally of the chute into the receiving hopper 12 of the sand projecting apparatus. Any suitable means may be used for agitating the chute H, but I prefer to equip the machine with an electrically-operated agitating mechanism consisting of an electric motor J mounted on a supporting structure on the carriage D, indicated as an entirety by the reference character K, a pinion 16 connected to the armature shaft of said motor J, and a gear 17 meshing with said pinion and secured to a horizontally-disposed shaft 18 that is provided with an eccentric 19 that actuates a link 20 whose rear end is pivotally connected to a depending bracket 21 on the chute H.

One feature that distinguishes my machine from machines that have heretofore been used for charging flasks and other molding devices with sand or other molding material, is that it is equipped with a power-operated means for moving the sand projecting apparatus E relatively to the flask during the operation of spreading the sand over the flask. In the form of my invention herein shown said power-operated means consists of a cylinder 22, arranged horizontally on the table B and rigidly connected to same, a reciprocating piston 23 in said cylinder, toothed wheels or pinions 24 rotatably mounted on a transversely-disposed axle 25 that is rigidly connected to the rod 26 of the piston 23, stationary rack bars 27 that mesh with the pinions 24, and movable racks 28 on the carriage D which also mesh with the pinions 24. When the piston 23 moves to the left, looking at Figure 5, the pinions 24 will revolve in anti-clockwise direction, and thus cause the carriage D to move forwardly or to the left into the position indicated in broken lines in Figure 2, and when said piston moves to the right said pinions will revolve in the opposite direction, and thus move the carriage rearwardly. Any other suitable means can be used for transmitting movement from the piston 23 to the carriage, but the means above described is very efficient, because it causes the carriage to travel at twice the speed of the piston. The means that I prefer to use for controlling the operating medium that is supplied to the cylinder 22 to reciprocate the carriage D forwardly and backwardly, consists of a conventional two-way valve L mounted on the front end of the crane, as shown in Figure 2, and adapted to be set in one position, so as to cause the port 29 therein to register with a supply pipe 30 and a pipe 31 that leads to the front end of the cylinder 22, and the port 32 therein to register with an exhaust pipe 33 and a pipe 34 that leads to the rear end of the cylinder, as shown in Figure 6, and adapted to be set in a different position so as to cause the port 29 to register with the pipe 31 and the exhaust pipe 33 and the port 32 to register with the supply pipe 30 and the pipe 34.

Assuming that the parts of the machine are in the position illustrated in full lines in Figure 2 and that it is desired to fill the flask $e$ with sand, the operator turns the handle 35 of the controlling valve L forwardly so as to cause the operating medium to be admitted to the rear end of the cylinder 22, thereby causing the piston in said cylinder to move forwardly, or to the left, and thus move the carriage D forwardly into a position where the discharge spout 13 of the sand projecting apparatus E is positioned over the flask, as indicated in broken lines in Figure 2. The sand is projected downwardly from the spout 13 by the rotor of the sand projecting apparatus, which is driven by the shaft 14, and in order that said sand will be distributed uniformly and evenly over the entire area of the flask, the operator swings the crane back and forth transversely of the flask and also turns the handle 35 of the controlling valve rearwardly and forwardly so as to reciprocate the carriage D, and thus move the spout 13 of the sand projecting apparatus E back and forth over the flask in a direction at substantially right angles to the direction in which the crane is swung. As the carriage D can be reciprocated at a high speed and the crane can be swung easily, the sand will be distributed evenly over the entire area of the flask. Moreover, this can be accomplished with very little exertion on the part of the operator in charge of the machine, as the movement of the sand discharge spout back and forth over the flask is accomplished, not manually, as in the machines of this general kind heretofore in use, but by a power-operated means, it being only necessary for the operator to turn the handle of the controlling valve L forwardly and backwardly and also swing the crane about the upright A on which the crane is mounted.

Having thus described my invention, what I claim as new and desire to secure by Letters Patent is:

1. A mold filling machine, comprising a crane, a carriage on said crane, a mold charging apparatus on said carriage, a fluid-operated piston, a stationary rack on said crane, a movable rack combined with said carriage, and a pinion meshing with said racks and operatively connected with said piston for moving said carriage.

2. A mold filling machine, comprising a swinging crane, a carriage reciprocatingly mounted on said crane, a mold charging apparatus on said carriage, means on said carriage for operating said charging apparatus, a delivery device for supplying molding material to said charging apparatus from a source of supply, means on said carriage for actuating said delivery device, and a fluid-operated means under control of the operator in charge of the machine for moving said carriage longitudinally of said crane and for reciprocating said carriage when said charging apparatus is positioned over a mold.

3. A mold filling machine, comprising a supporting structure, a rotatable table on said structure, horizontally-disposed members projecting laterally from said table, rails carried by said members, a carriage traveling on said rails, a mold charging apparatus on said carriage, a cylinder on said table provided with a piston, mechanism for transmitting movement from said piston to said carriage, and means for controlling the admission and exhaust of an operating medium to and from said cylinder.

4. A mold filling machine, comprising a supporting structure, a rotatable table on said structure, horizontally-disposed members projecting laterally from said table, rails carried by said members, a carriage traveling on said rails, a mold charging apparatus on said carriage, a cylinder on said table provided with a piston, stationary rack bars combined with said rails, pinions meshing with said rack bars and operatively connected with said piston, and rack bars on said carriage meshing with said pinions and adapted to be moved by same when said piston is operated.

5. A mold filling machine, comprising a post or upright, a horizontally-disposed table rotatably mounted on said upright, a friction-reducing bearing interposed between said upright and table, horizontally-disposed members projecting laterally from said table and provided with rails, a carriage traveling on said rails, a mold charging apparatus on said carriage, a delivery chute for supplying molding material to said charging apparatus, a motor on said carriage for actuating said charging apparatus, an electrically-operated means on said carriage for vibrating said delivery chute, a fluid-operated means carried by said table, and a rack and pinion mechanism for transmitting movement from said fluid-operated means to said carriage.

WALTER H. WANGELIN.